March 10, 1964     W. WIERENGA, SR     3,124,101
POULTRY CAGE CONSTRUCTION
Filed Dec. 21, 1960     3 Sheets-Sheet 1

INVENTOR.
WILLIAM WIERENGA, SR.
BY
ATTORNEYS

March 10, 1964  W. WIERENGA, SR  3,124,101
POULTRY CAGE CONSTRUCTION
Filed Dec. 21, 1960  3 Sheets-Sheet 2
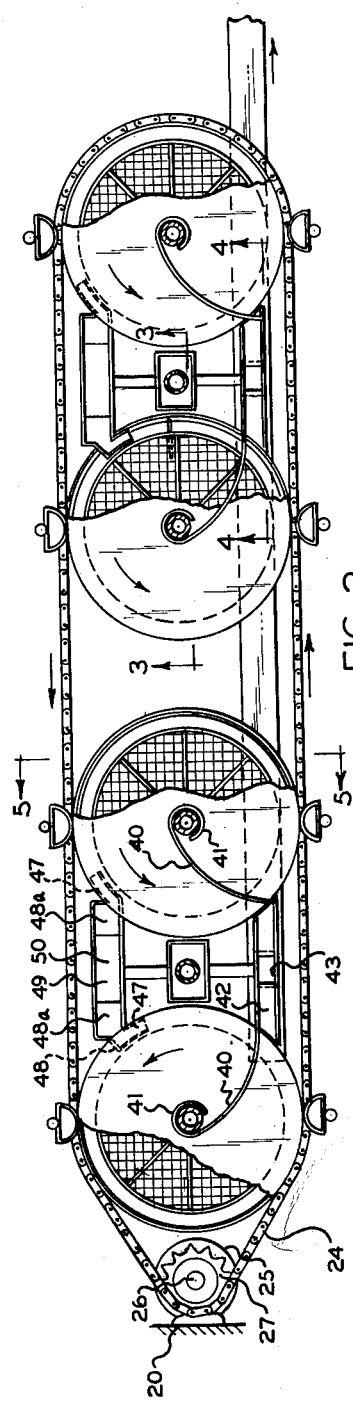
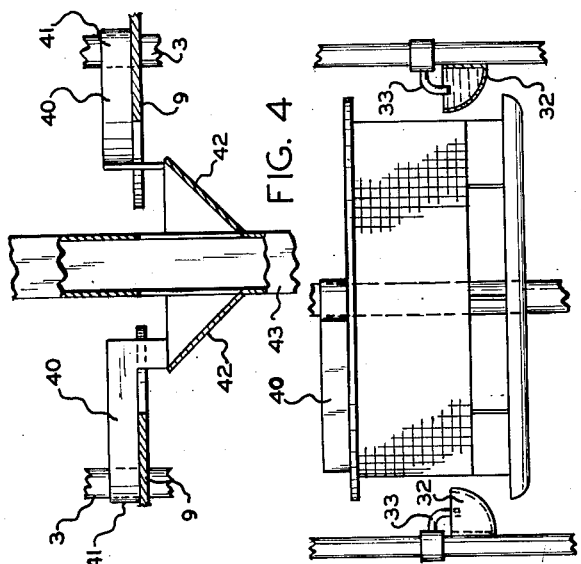
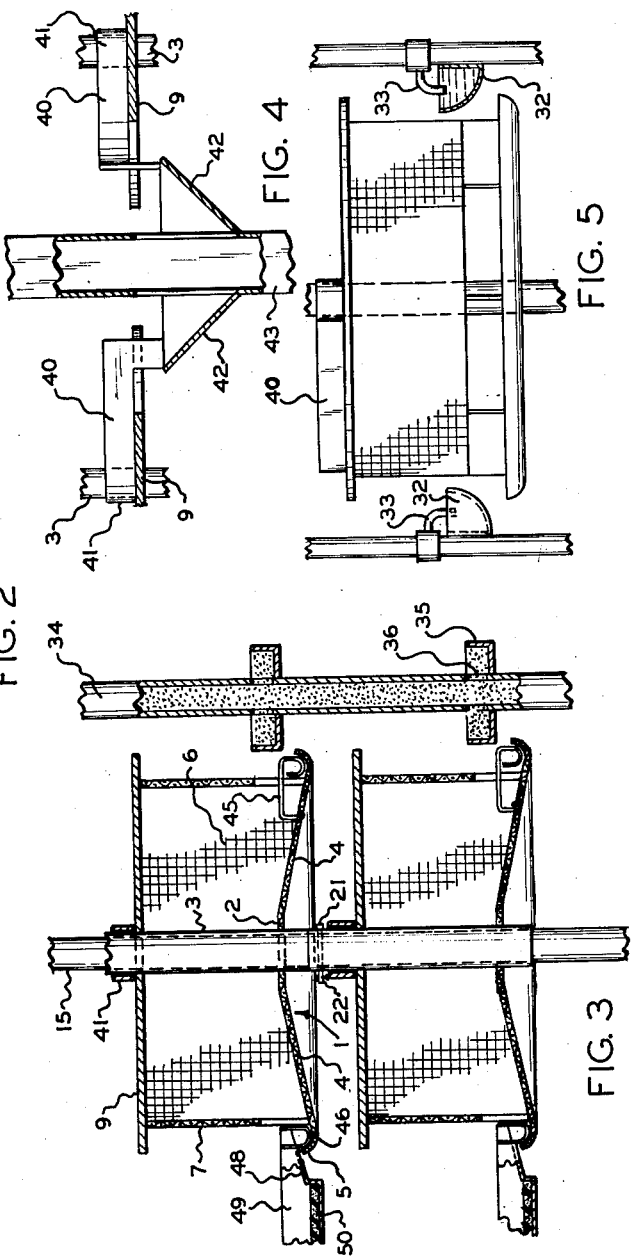
INVENTOR.
WILLIAM WIERENGA, SR.
BY
ATTORNEYS March 10, 1964   W. WIERENGA, SR   3,124,101
POULTRY CAGE CONSTRUCTION Filed Dec. 21, 1960   3 Sheets-Sheet 3

INVENTOR
WILLIAM WIERENGA, SR.

BY *Learman, Learman & McCulloch*

ATTORNEYS

3,124,101
POULTRY CAGE CONSTRUCTION
William Wierenga, Sr., Rte. 1, Box 73, Nunica, Mich.
Filed Dec. 21, 1960, Ser. No. 77,338
4 Claims. (Cl. 119—22)

This invention relates to cage constructions for poultry and more particularly to cages adapted to contain a plurality of laying chickens or the like and equipped with means for automatically feeding and watering the fowl, collecting the eggs, and maintaining the cages in a sanitary condition.

An object of the invention is to provide a laying hen cage construction capable of containing a large number of hens and which readily lends itself to automated feeding, watering, egg gathering and cleaning operations.

Another object of the invention is to provide apparatus of the kind referred to which is capable of use with either single or multiple cage units.

Another object of the invention is to provide a plurality of cages adapted to be arranged vertically and which are so constructed that the top of a lower cage not only functions to close such cage but also facilitates the removal of droppings from a higher cage.

A further object of the invention is to provide cages of such construction as to promote their use in groups and to provide single operating means for presenting a plurality of chickens in each cage successively to feeding and watering stations.

Other objects and advantages of the invention will be pointed out specifically or will become apparent from the following description when it is considered in conjunction with the appended claims and the accompanying drawings, in which:

FIGURE 2 is a sectional view, with parts broken away, taken on the line 2—2 of FIGURE 1;

FIGURE 3 is a sectional view taken on the line 3—3 of FIGURE 2;

FIGURE 4 is an enlarged sectional view taken on the line 4—4 of FIGURE 2;

FIGURE 5 is an enlarged side elevational view taken on the line 5—5 of FIGURE 2;

Figure 1:
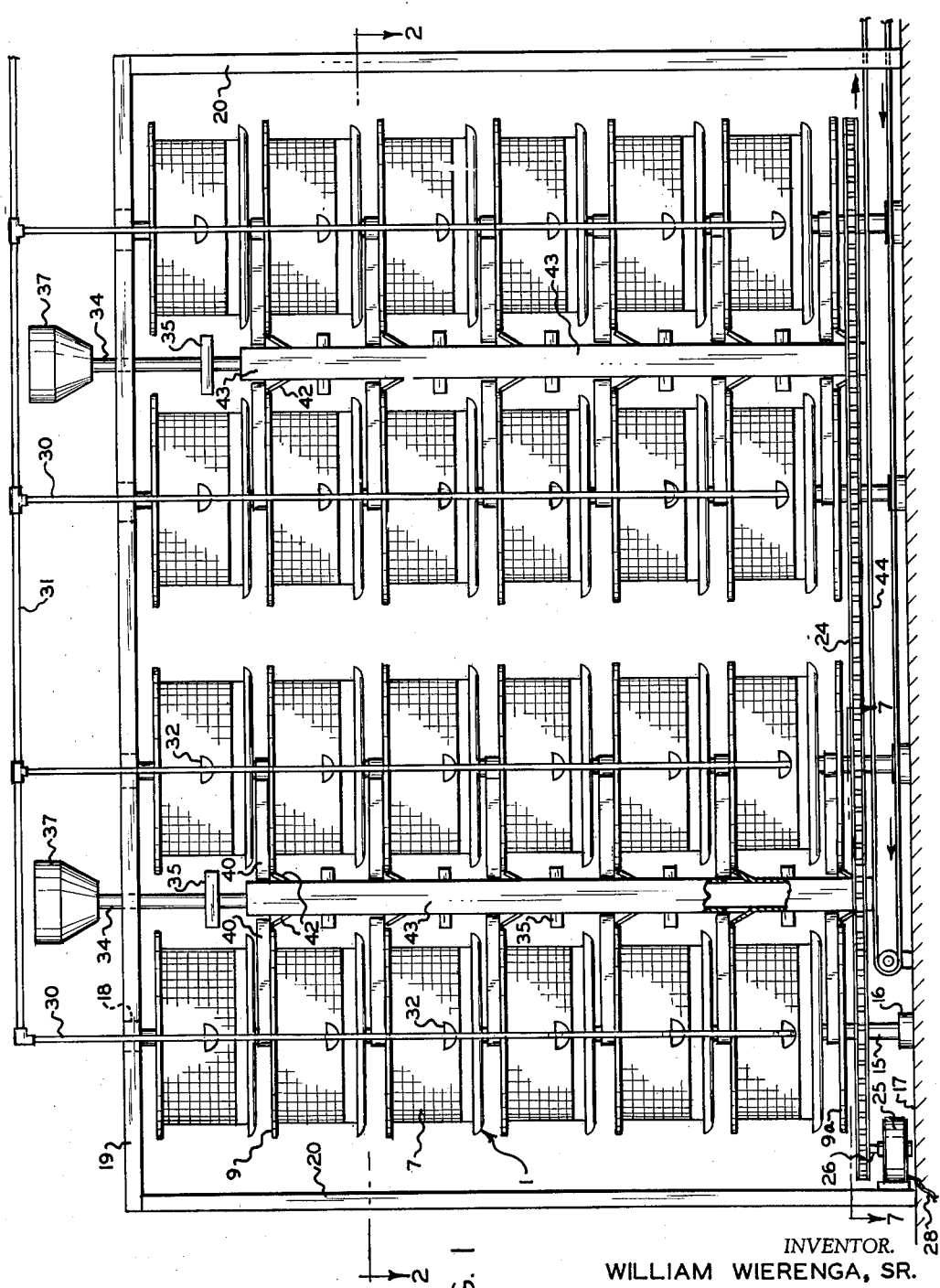
FIGURE 1 is a view, partly in side elevation and partly in section, of a plurality of cages constructed in accordance with the invention and arranged in such manner as to facilitate their being driven by a single operating device.
Figure 6:
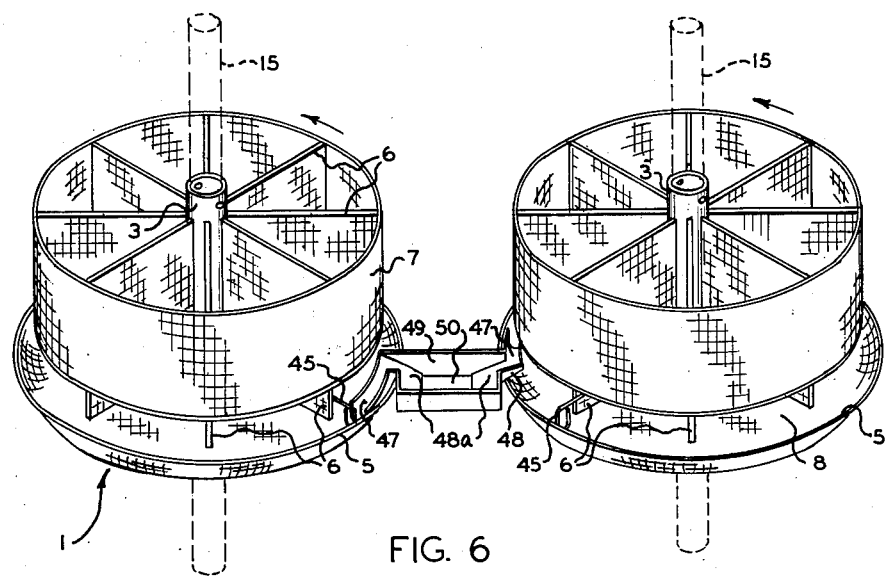
FIGURE 6 is an isometric view of a pair of cages constructed in accordance with the invention.
Figure 7:
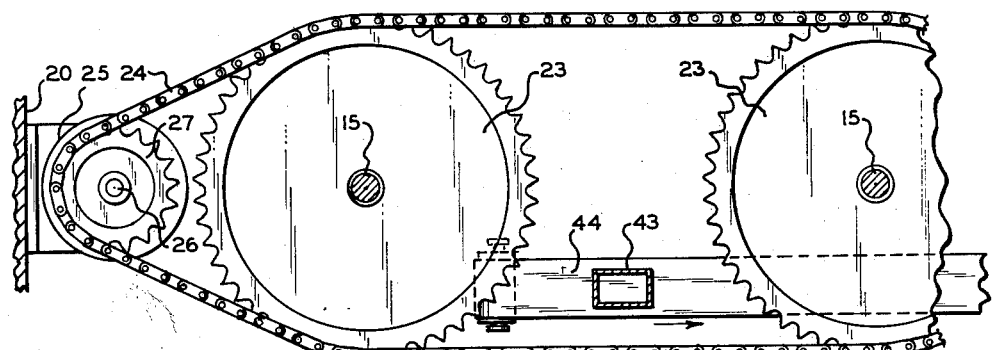
FIGURE 7 is a sectional view taken on the line 7—7 of FIGURE 1.

Each of the cages disclosed in the drawings is identical, so only one need be described in detail. Each cage comprises a foraminous base member 1 (see FIGURE 6) formed of wire mesh. The diameter of the base member 1 may vary, but one size which has been found to be convenient is a base having a diameter of about four feet. As is best shown in FIGURE 3, the central portion 2 of the base member 1 preferably is substantially horizontal and is welded or otherwise suitably secured to a centrally located sleeve 3 about which more will be said subsequently. Radially outwardly of the central portion 2 of the base, the latter slopes downwardly and outwardly as at 4 and terminates in an upwardly curved edge or flange 5. Also welded or otherwise suitably fixed to the sleeve 3 is a plurality of radially extending partition members 6 and the lower edges of such members preferably are welded or otherwise fixed to the base 1 so as to be supported thereby. The partition members 6 may be formed either of wire mesh or of imperforate plates, and they do not extend completely to the peripheral edge of the base 1, but terminate short of the latter as is shown in FIGURE 3. Secured to the radially outer edges of the partition members 6 is a wire band 7 forming a circular wall or enclosure which, together with the partitions 6, forms a plurality of compartments above each base member 1 and in which may be received one or more chickens. The wall 7 does not extend completely to the base 1, but terminates short of the latter so as to provide an opening 8 at the peripheral edge of each compartment. The height of the opening 8 should be such as to enable an egg to pass therethrough without any difficulty, but prevent the body of the hen from passing through the opening.

Each cage includes an upper closure 9 which may comprise a thin, light metal or wood disc having a central opening to accommodate the sleeve 3, the closure 9 preferably being welded or otherwise fixed both to the sleeve 3 and to the upper edges of the partition members 6 and the wall member 7. The closure 9 not only serves to close the tops of the compartments but also performs another function, as will be pointed out hereinafter.

Figure 8:
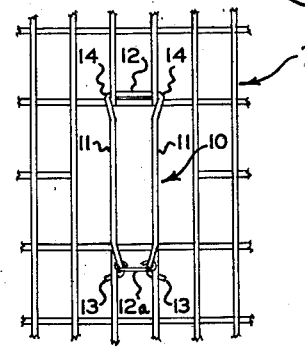
FIGURE 8 is an enlarged, fragmentary detail of a portion of one of the cages.

Access to each compartment of a cage may be obtained through an opening formed in the wall 7, the opening being provided by cutting certain of the wires forming the wall. As is shown in FIGURE 8, a movable door 10 is provided and comprises a generally U-shaped wire frame element having parallel legs 11 joined to one another by a crossbar 12. The crossbar 12 is provided with a pair of inwardly extending loop portions 14 which are adapted to engage one of the cross wires of the wall 7, and the lower ends of the legs 11 may be forwardly deflected to form hooks 13 adapted to engage the outer surface of a lower cross wire of the wall 7. A slideable stay 12a slideably receives the legs 11 and is adapted to slide toward the bar 12 to permit the hook portions to be squeezed toward one another and allow raising of the door, but prevents such movement of the hook portions when in the position shown in FIGURE 8. The arrangement is such that the door member 10 can be raised so as to provide access to the interior of the associated compartment, but when the door is in its closed position, as shown in FIGURE 8, birds located in the compartment can neither escape from the latter nor open the door.

Cages of the kind described are adapted to be assembled in vertically spaced relation on a vertical shaft 15 that is rotatably mounted at its lower end in a bearing 16 that may be fixed to the floor 17 of a hen house. The upper end of the shaft 15 may be journaled in a bearing 18 mounted in a horizontal frame member 19 which may be supported by vertical frame members 20. The cages are assembled on the shaft 15 by slipping the sleeves 3 over the shaft and, as is best shown in FIGURE 3, the ends of the sleeves 3 project beyond the upper and lower edges of their associated cages so that the lower edge of one sleeve abuts the upper edge of the lower sleeve so as to space the cages from one another. Various means may be used to fix the cages to the shaft 15 and one such means may comprise a headed bolt 21 extending through aligned openings in the shaft 15 and the associated sleeve so as to key each sleeve to the shaft. The bolts may be restrained against inadvertent separation from the assembly by means of cotter pins 22.

In the illustrative embodiment of the invention, four tiers of six cages each are provided within the framework formed by the members 19 and 20. It will be understood, however, that both the number of tiers and the number of cages in a tier may vary within wide limits.

Means is provided for rotating each tier of cages about the axis of its shaft 15. In the illustrative embodiment of the invention the means for rotating each tier of cages comprises a sprocket wheel 23 fixed on each shaft near the lower end of the latter and around which is trained a sprocket chain 24. A driving motor 25 is mounted on a frame member 20 that includes a driven shaft 26 on which is mounted a sprocket 27 around which the chain 24 also is trained. The motor 25 may be connected by wires 28 to a suitable source of electric energy so as to cause rotation of the sprocket 27 and, consequently, rotation of each of the sprocket wheels 23 and the cages associated therewith. Preferably, the speed of rotation of the motor 25 and the ratio between the sprocket wheels 23 and 27 are such that each shaft 15 makes one complete revolution per hour. The speed of rotation of the shafts 15, however, may be varied if desired.

In the use of cages constructed and arranged in accordance with the invention, chickens or the like located within the cages are adapted to remain there from the time they begin to lay eggs until their egg production is no longer commercially profitable. Consequently, means must be provided for watering and feeding the fowl.

Means for watering the chickens comprises a plurality of water pipes 30 connected to overhead supply pipes 31 and extending vertically along opposite sides of each tier of cages so as to provide a plurality of watering stations for each tier of cages. At intervals along the length of the pipes 30 are located cups 32 of conventional construction and adapted to contain water, the water being introduced automatically to the interior of the cups 32 by means of spigots 33 that also are of conventional and known construction. Each of the cups 32 is so located with respect to its associated cage as to permit a chicken within a particular compartment located opposite a cup 32 to extend its head between adjacent wires forming the wall 7 and gain access to the water in the cup.

Means for providing a feeding station for each cage of a particular tier comprises a hollow, vertically extending pipe 34 having a plurality of trays 35 supported thereby at intervals along its length and corresponding substantially to the level of the water cups 32. The feed pipe 34 may be provided with openings 36 at the trays 35 so as to enable feed in the pipe 34 to spill automatically into the trays. Feed may be introduced to the feed pipe 34 through a hopper 37 at the upper end of the pipe. In those instances where more than one tier of cages is provided, it is convenient to locate a feed pipe 34 between adjacent tiers of cages, thereby avoiding the necessity of providing a separate feed pipe for each tier of cages. The feed pipes 34 may be supported in any convenient manner, such as by the horizontal frame element 19 and by suitable stabilizing rods (not shown) fixed to the supporting structure at convenient locations.

Each of the panels 9 atop the lower cages constitutes a board for collection of droppings from the next higher cage. A similar panel 9a is fixed to each shaft 15 beneath the lowermost cage of a tier for the same purpose. Means for clearing droppings from the dropping boards comprises a scraper blade 40 having a hooked end 41 which loosely receives the associated sleeve 3 and having its other end welded or otherwise rigidly fixed to a downwardly inclined slide 42 that communicates with the interior of a vertical pipe 43 extending alongside a tier of cages. The arrangement of the blades 40 is such that rotation of the associated dropping board 9 causes the blade to scrape the upper surface of the panel 9 and remove droppings therefrom. As is best indicated in FIGURE 2, the scraper blades 40 are so positioned relatively to the panels 9 that they are bowed or inclined from the axis of rotation of the cages outwardly and in the direction of rotation so as to cause the droppings to move progressively toward the peripheral edge of the panel and ultimately to be received by the associated slide 42 for delivery to the pipe 43. The lower end of each pipe 43 is open and may be positioned directly over an endless belt 44 that may be driven by a motor (not shown) like the motor 25 in such direction as to convey accumulated droppings from the pipes 43 out of the chicken house or to any convenient location.

As has been pointed out earlier, each base portion 1 slopes downwardly and outwardly from its central section 2. As a result, eggs laid by chickens in the compartments may roll through the opening 8 and come to rest at the periphery of the cage. The eggs may be permitted to remain on the flanges until they are gathered, but it is preferable to remove the eggs from the flanges by automatic means. Each compartment preferably has pivotally connected to its base portion a blade member 45 formed of wire that has one of its ends looped around a wire forming part of the base and its other end shaped as a paddle 46 or the like so as to be adapted to bear against an egg lying in the flange 5 and push the egg, during rotation of the cage, up an inclined ramp 47 that lies in the path of eggs being rotated by the cages. Continued rotation of a cage will cause the blade member 45 to push the egg up the inclined ramp 47 until the egg engages a wall 48 which is of sufficient height to prevent the egg's being pushed off the rear edge of the ramp 47. During this movement of the cage, the blade member 45 will be pivoted about its connection to the cage base and, when the cage has rotated a distance sufficient to disengage the blade member from the egg, the blade member will drop by gravity to the position shown in FIGURE 3. Upon the release of the egg by the blade member 45, the egg will roll down a downwardly inclined ramp 48a leading to a tray 49 where the egg may remain until collected. Preferably, the bottom of the tray is lined with a soft material 50 such as foam rubber, polyurethane, or the like. If desired, the egg trays 49 could be replaced by endless belts or the like so as to deliver the collected eggs to a convenient point of assembly.

As is shown in FIGURE 2, there may be one egg tray for each cage or, alternatively, an egg tray may be adapted to serve as a receiver for eggs from a pair of adjacent trays at the same level. In any event, there should be a tray adapted to receive eggs from each cage and the tray may be supported in any convenient manner, such as by being clamped to a water delivery pipe, supported from the frame members 19 and 20, or in any other convenient manner.

The disclosed embodiment is illustrative of a presently preferred form of the invention, but is intended to be illustrative rather than definitive thereof. The invention is defined in the claims.

I claim:

1. A cage construction for fowl comprising a generally cylindrical enclosure having a foraminous base; an imperforate disk spaced below said base; means mounting said enclosure and said disk for conjoint rotation about an axis; a scraper member interposed between said base and said disk and in engagement with the upper surface of the latter, said scraper member extending radially outwardly from said axis and being inclined in the direction of rotation of said disk; means fixedly mounting said scraper means, whereby relative rotation between said disk and said scraper member effects scraping of the upper surface of said disk; and means for rotating said enclosure and said disk.

2. A cage construction for fowl comprising a plurality of generally cylindrical enclosures arranged in vertically spaced relation; a foraminous member forming a bottom for each of said enclosures and through which droppings may pass; an imperforate plate member interposed between adjacent enclosures and forming a top for the lower one of said adjacent enclosures; rotatable support means extending through each of said enclosures centrally thereof and forming a common axis of rotation for said enclosures; means carried by each of said enclosures and mounting the latter on said support means for rotation therewith about said axis; a scraper member in engagement wtih each of said plate members and extending substantially radially thereof; means fixing each of said scraper members against rotation, whereby rotation of said support means effects scraping of said plate members by said scraper member; and continuously operable means for rotating said support means.

3. The construction set forth in claim 2 including a vertical discharge tube; means mounting said tube adjacent the peripheral edges of said plate members; and delivery means positioned beneath the peripheral edge of each of said plate members and in communication with said tube for delivering to the latter droppings removed by said scraper members.

4. The construction set forth in claim 2 wherein each of said scraper members is arcuate and curves from the axis of rotation of said enclosures radially outwardly and in the direction of rotation of said enclosures.

References Cited in the file of this patent

UNITED STATES PATENTS

| | | |
|---|---|---|
| 2,191,651 | Haesloop | Feb. 27, 1940 |
| 2,257,734 | Cornell | Oct. 7, 1941 |
| 2,311,640 | Cornell | Feb. 23, 1943 |
| 2,698,599 | Kalmoe | Jan. 4, 1955 |
| 2,969,040 | Siptrott | Jan. 24, 1961 |
| 3,018,759 | Helbig | Jan. 30, 1962 |
| 3,045,612 | Byrnes | July 24, 1962 |